US010753386B2

(12) United States Patent
Riley et al.

(10) Patent No.: US 10,753,386 B2
(45) Date of Patent: Aug. 25, 2020

(54) QUICK RELEASE FEATURE FOR GAS ASSIST STRUTS

(71) Applicant: Ford Global Technologies, LLC, Dearborn, MI (US)

(72) Inventors: Patrick Riley, Canton, MI (US); Ed Wilson, Livonia, MI (US); Michael J. Gardynik, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 235 days.

(21) Appl. No.: 15/919,641

(22) Filed: Mar. 13, 2018

(65) Prior Publication Data
US 2019/0285113 A1    Sep. 19, 2019

(51) Int. Cl.
*F16C 11/06* (2006.01)
*B62D 65/02* (2006.01)
*E05F 15/53* (2015.01)

(52) U.S. Cl.
CPC .......... *F16C 11/0623* (2013.01); *B62D 65/02* (2013.01); *F16C 11/069* (2013.01); *F16C 11/0695* (2013.01); *E05F 15/53* (2015.01); *E05Y 2600/50* (2013.01); *E05Y 2600/60* (2013.01); *E05Y 2900/55* (2013.01); *F16C 2326/01* (2013.01)

(58) Field of Classification Search
CPC .. F16C 11/0623; F16C 11/069; F16C 11/0695
See application file for complete search history.

(56) References Cited

U.S. PATENT DOCUMENTS

| 3,269,760 | A | * | 8/1966 | Clifford | F16C 11/069 403/122 |
| 3,876,232 | A | | 4/1975 | Pertusi | |
| 4,815,883 | A | * | 3/1989 | Takke | F16C 1/14 403/141 |
| 6,113,301 | A | | 9/2000 | Burton | |
| 7,044,018 | B2 | * | 5/2006 | Sanchez | F16C 1/108 403/135 |
| 7,124,864 | B2 | | 10/2006 | Jones et al. | |
| 7,993,070 | B2 | | 8/2011 | Kull et al. | |

FOREIGN PATENT DOCUMENTS

| DE | 102004050552 A1 | * | 4/2006 | ............. F16B 2/245 |
| EP | 0413623 A1 | * | 2/1991 | ............ F16C 11/069 |
| EP | 1906034 A2 | * | 4/2008 | ............ F16C 11/069 |

(Continued)

OTHER PUBLICATIONS

Espacenet translation of DE '552 (Year: 2006).*

(Continued)

*Primary Examiner* — Hilary L Gutman
(74) *Attorney, Agent, or Firm* — David Coppiellie; Carlson, Gaskey & Olds, P.C.

(57) ABSTRACT

An end cap for a gas assist strut according to an exemplary aspect of the present disclosure includes, among other things, a body providing a socket, a spring clip having ends projecting into the socket, and a lever. The lever is arranged such that application of pressure to the lever draws the ends of the spring away from one another. This disclosure also relates to a motor vehicle including the subject end cap. A method is also disclosed.

19 Claims, 2 Drawing Sheets

(56) References Cited

FOREIGN PATENT DOCUMENTS

| | | | | |
|---|---|---|---|---|
| EP | 2463534 A2 | * | 6/2012 | ............ F16C 11/069 |
| GB | 906761 A | | 9/1962 | |
| WO | WO-0065245 A1 | * | 11/2000 | .............. F16C 1/108 |

OTHER PUBLICATIONS

Zahl, Timothy. "How to Replace Hood Latch Cables and Hood Support Struts," CARiD, articles, Nov. 12, 2014. Downloaded from: https://www.carid.com/articles/how-to-replace-hood-latch-cables-and-hood-support-struts.html.

* cited by examiner

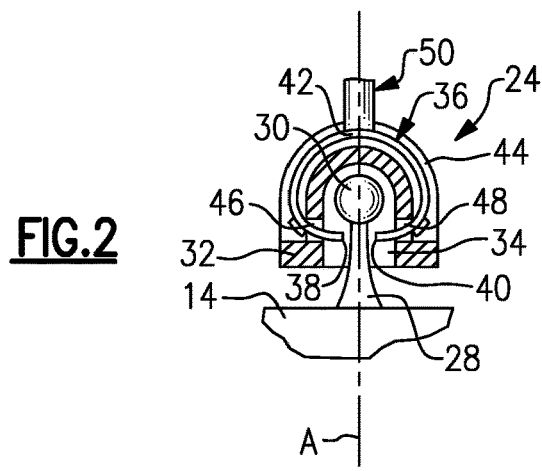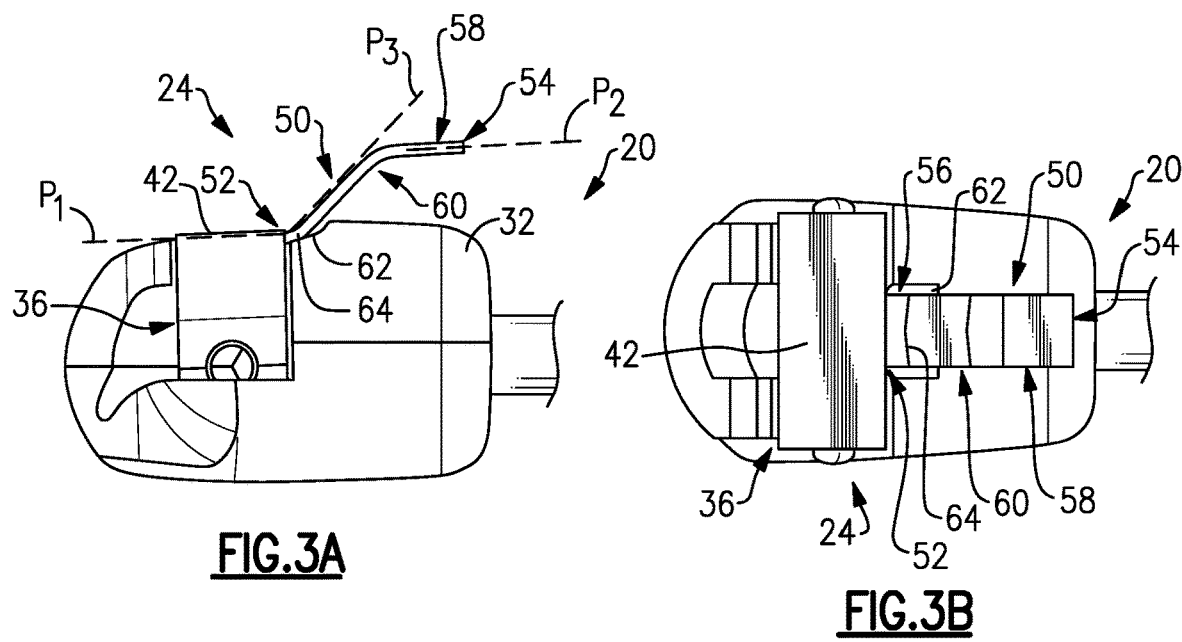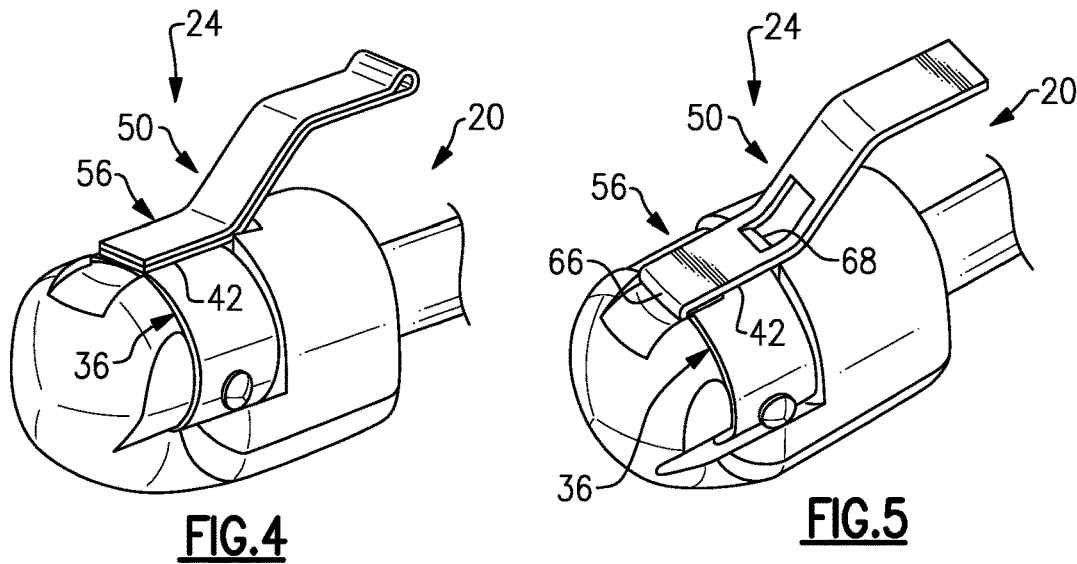

QUICK RELEASE FEATURE FOR GAS ASSIST STRUTS

TECHNICAL FIELD

This disclosure relates to a quick release feature for gas assist struts.

BACKGROUND

Minivans, sport utility vehicles (SUVs), hatchbacks, and other vehicles have an opening defined in a rear portion of the vehicle's body. Ordinarily, these vehicles include liftgates that are used to selectively open and close the opening in the rear portion of the vehicle. Some vehicles include a flipglass window, which is mounted adjacent the liftgate and can be opened and closed independent of the liftgate to selectively expose a portion of the opening.

Some known liftgate assemblies include at least one strut (e.g., a single strut or a pair of struts) mounted between the liftgate and the vehicle's body. These struts, which may be gas assists struts (sometimes referred to as pneumatic struts or gas struts), regulate movement of the liftgate as the liftgate opens and closes. When the vehicle includes a flipglass window, the vehicle may include at least one other strut connected to the flipglass window.

SUMMARY

An end cap for a gas assist strut according to an exemplary aspect of the present disclosure includes, among other things, a body providing a socket, a spring clip having ends projecting into the socket, and a lever. The lever is arranged such that application of pressure to the lever draws the ends of the spring away from one another.

In a further non-limiting embodiment of the foregoing end cap, the spring clip includes a center section between the ends, and the center section is arranged on an outside of the body.

In a further non-limiting embodiment of any of the foregoing end caps, the lever includes a first end adjacent the center section of the spring clip and a second end opposite the first end.

In a further non-limiting embodiment of any of the foregoing end caps, the second end is a free end.

In a further non-limiting embodiment of any of the foregoing end caps, the lever is integrally formed with the spring clip.

In a further non-limiting embodiment of any of the foregoing end caps, the first end of the lever is attached to the center section of the spring clip.

In a further non-limiting embodiment of any of the foregoing end caps, the lever is welded to the center section of the spring clip.

In a further non-limiting embodiment of any of the foregoing end caps, the lever is crimped onto the center section of the spring clip.

In a further non-limiting embodiment of any of the foregoing end caps, the lever includes a first section adjacent the first end, a second section adjacent the second end and spaced-apart from the first section, and an inclined section between the first and second sections, and the inclined section is oblique to the first and second sections.

In a further non-limiting embodiment of any of the foregoing end caps, an upper surface of the body provides a fulcrum for the lever.

In a further non-limiting embodiment of any of the foregoing end caps, a junction between the first section and the inclined section of the lever is configured to contact the fulcrum.

In a further non-limiting embodiment of any of the foregoing end caps, the upper surface of the body includes a recess, and a surface of the junction is arranged in the recess.

In a further non-limiting embodiment of any of the foregoing end caps, the surface of the junction is rounded.

A motor vehicle according to an exemplary aspect of the present disclosure includes, among other things, a component having a ball supported on a stem, and a gas assist strut connected to the component. The gas assist strut includes an end cap, which itself includes a body providing a socket which receives the ball, a spring clip having ends projecting into the socket, and a lever. The lever is arranged such that application of pressure to the lever draws the ends of the spring away from one another such that the ball may be removed from the socket.

In a further non-limiting embodiment of the foregoing motor vehicle, an upper surface of the body provides a fulcrum for the lever.

In a further non-limiting embodiment of any of the foregoing motor vehicles, the component is a one of a vehicle body, a liftgate, a swing gate, and a flipglass window.

A method according to an exemplary aspect of the present disclosure includes, among other things, applying pressure to a lever of an end cap of a gas assist strut, thereby drawing ends of a spring clip away from one another, and removing a ball from a socket of the end cap.

In a further non-limiting embodiment of the foregoing method, the ends of the spring clip project into the socket when pressure is not applied to the lever.

In a further non-limiting embodiment of any of the foregoing methods, the ends of the spring clip are biased toward one another.

In a further non-limiting embodiment of any of the foregoing methods, the ball is attached to a component of a motor vehicle.

BRIEF DESCRIPTION OF THE DRAWINGS

FIG. 2 is a cross-sectional view of an example end cap, taken along line 2-2 in FIG. 1, and illustrates a ball received in a socket of the end cap.

FIG. 3A is a side view of an example end cap.

FIG. 3B is a top view of the end cap of FIG. 3A.

FIG. 4 is a perspective view of another example end cap.

FIG. 5 is a perspective view of still another example end cap.

DETAILED DESCRIPTION

Figure 1:
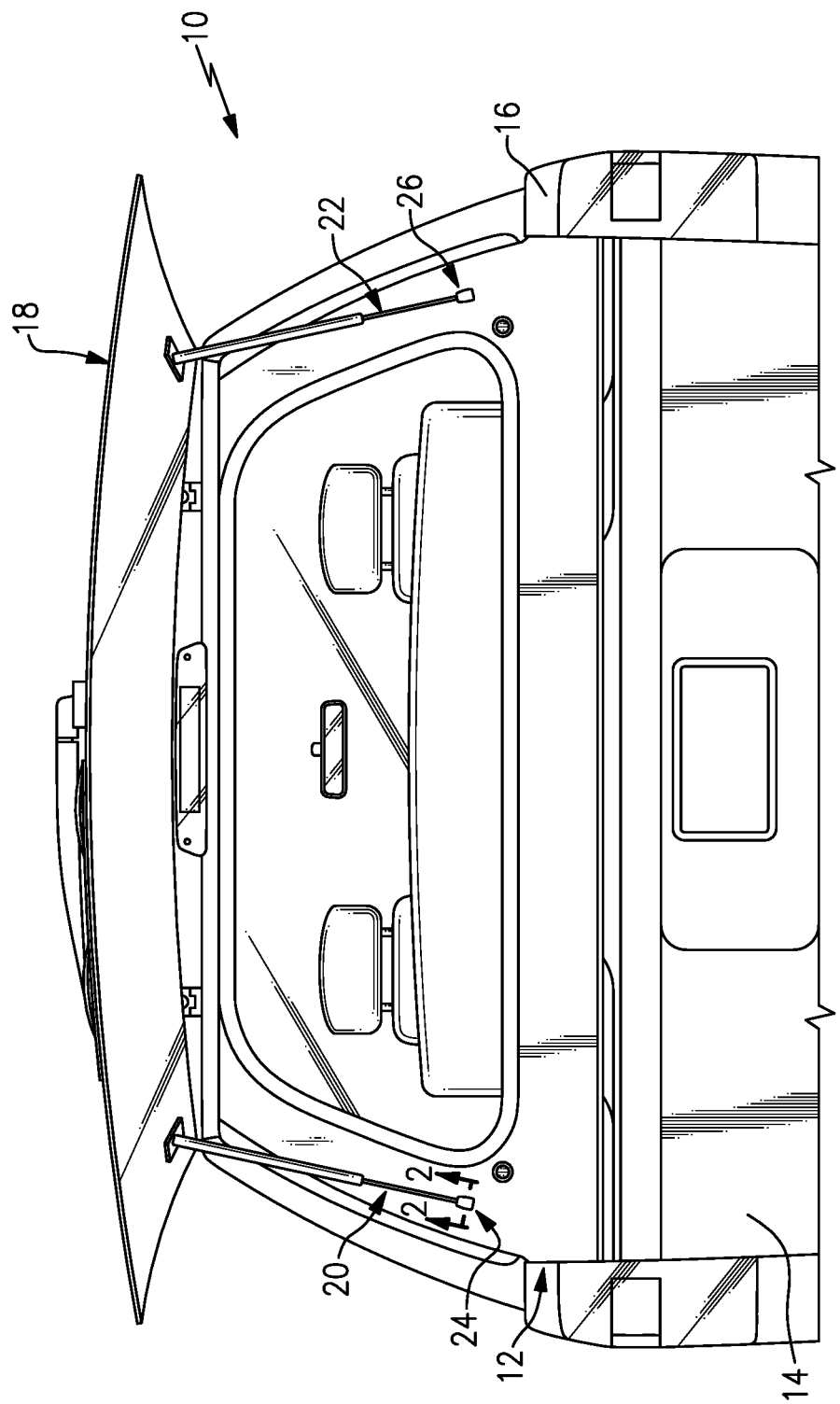
FIG. 1 is a rear view of a portion of a motor vehicle with an example liftgate. In this example, the vehicle includes a flipglass window.

This disclosure relates to a quick release feature for gas assist struts. In particular, one aspect of this disclosure relates to an end cap for a gas assist strut. The end cap includes a body providing a socket, which may receive a ball. The ball may be attached to a component of the motor vehicle, such as a liftgate, swing gate, flipglass window, or a vehicle body. The end cap further includes a spring clip having ends projecting into the socket. The ends are biased toward one another, and are configured to retain the ball in the socket. The end cap further includes a lever, which is arranged such that application of pressure to the lever draws the ends of the spring away from one another, thereby allowing the ball to be removed from the socket.

Among other benefits, this disclosure allows for relatively quick release of the gas assist strut, and does so without requiring any special tools. In other words, the gas assist strut can be released simply by a user applying pressure to the lever using their finger or thumb, as examples. Thus, the user may detach the gas assist struts, and the components connected to the gas assist struts, with relative ease. Further, the design of the spring clip and lever does not require an intricate design of the body of the end cap, which leads to reduced cost and increased ease of manufacture and assembly. In some examples, the spring clip and lever can even be applied to existing end cap designs. These and other benefits will be appreciated from the below discussion.

Referring to the drawings, FIG. 1 is a rear view of a portion of a motor vehicle 10, which is shown as a sport utility vehicle (SUV), including an example liftgate assembly 12. While FIG. 1 shows an SUV, this disclosure is not limited to SUVs and extends to other vehicles, including minivans, hatchbacks, and trucks.

In this example, the liftgate assembly 12 includes a liftgate 14 rotatable between a fully open position and a closed position to selectively open and close (respectively) an opening defined in a rear of a vehicle body 16. The liftgate 14 is pivotally mounted to the vehicle body 16 near an upper edge of the liftgate 14. As used in this disclosure, the vehicle body 16 refers to the frame (including pillars) and paneling of the vehicle 10.

The vehicle 10 also includes a flipglass window 18 in this example. The flipglass window 18 is rotatable between a fully open and closed position to selectively expose a portion of the opening defined in the rear of the vehicle body 16. In this example, the flipglass window 18 is rotatable relative to the liftgate 14, such that the flipglass window 18 can be opened while the liftgate 14 remains closed, as shown in FIG. 1. In other embodiments, the flipglass window 18 can be mounted directly to the vehicle body 16. Like the liftgate 14, the flipglass window 18 is pivotally mounted to the vehicle body 16 near an upper edge of the flipglass window 18.

As shown in FIG. 1, the flipglass window 18 is connected to the liftgate 14 by way of two gas assist struts 20, 22. The gas assist struts 20, 22 are arranged on opposite sides of the flipglass window 18 and regulate movement of the flipglass window 18 as the flipglass window 18 opens and closes. While not shown in FIG. 1, the liftgate 14 may be connected to the vehicle body 16 by similar gas assist struts. Further, while gas assist struts are shown and described herein, this disclosure extends to other structures that regulate movement, including gas springs, dampers, and gas shocks.

The gas assist struts 20, 22 are connectable to the liftgate 14, in this example, by way of a ball-and-socket connection. The ball-and-socket connections are provided in part by end caps 24, 26 of the gas assist struts 20, 22. While end caps 24, 26 are shown only on one end of the respective gas assist strut 20, 22, it should be understood that both ends of the gas assist struts 20, 22 may include end caps. The end caps 24, 26 allow one to relatively quickly detach the gas assist struts 20, 22 from the liftgate 14 and the flipglass window 18. While the gas assist struts 20, 22 and the end caps 24, 26 are illustrated relative to a liftgate 14 and a flipglass window 18, it should be understood that this disclosure extends to gas assist struts and end caps connected to other vehicle components.

FIG. 2 is a cross-sectional view of the end cap 24, and illustrates an example connection between the gas assist strut 20 and the liftgate 14. While not shown in FIG. 2, it should be understood that the end cap 26 is arranged substantially the same as the end cap 24.

As shown in FIG. 2, a stem 28 projects from the liftgate 14, and the stem 28 has a ball 30 at a free end thereof. The stem 28 and ball 30 project outward from the liftgate 14 along an axis A. The stem 28 and ball 30 may be made of a metallic material in one example.

The end cap 24 has a body 32 providing a socket 34. In FIG. 2, the ball 30 is received in the socket 34. The socket 34 is disposed along the axis A. The end cap 24 may be made of a plastic material in some examples.

The end cap 24 further includes a spring clip 36. The spring clip 36 is made of a relatively thin piece of metallic material, in this example. The spring clip 36 has a first end 38, a second end 40, and a center section 42 between the first and second ends 38, 40. The center section 42 is disposed on an outside of the body 32 of the end cap 24. The first and second ends 38, 40, on the other hand, are arranged such that they project into the socket 34. The spring clip 36 is configured such that the first and second ends 38, 40 are biased toward one another and toward the axis A.

In general, the body 32 is arranged to accommodate the spring clip 36. In this example, the body 32 includes a groove 44 on an exterior thereof. The body 32 further includes first and second slots 46, 48 through which a respective one of the first and second ends 38, 40 projects into the socket 34. This disclosure is not limited to the details of the body 32 illustrated in FIG. 2.

In FIG. 2, the first and second ends 38, 40 are biased toward one another under the natural bias of the spring clip 36. Further, the first and second ends 38, 40 are arranged between the ball 30 and the liftgate 14. Thus, the first and second ends 38, 40 retain the ball 30 in the socket 34. In order to remove the ball 30 from the socket 34, the first and second ends 38, 40 must be drawn away from one another and away from the axis A.

In this disclosure, the end cap 24 includes a lever 50 configured to draw the first and second ends 38, 40 away from one another upon application of pressure to the lever 50. The lever 50 is perhaps best seen in FIGS. 3A and 3B, which illustrate an example end cap 24 from a side view and a top view, respectively.

With reference to FIGS. 3A and 3B, the lever 50 includes a first end 52 adjacent the center section 42 of the spring clip 36 and a second end 54 opposite the first end 52. The first end 52 is directly connected to the center section 42, and the second end 52 is a free end.

Adjacent the first end 52, the lever 50 includes a first section 56. The lever 50 further includes a second section 58 adjacent the second end 54, and an inclined section 60 between the first and second sections 56, 58. The inclined section 60 is oblique to the first and second sections 56, 58. Here, the term oblique is used to mean that the inclined section 60 is neither perpendicular nor parallel to either of the first and second sections 56, 58. In particular, with reference to FIG. 3A, the first section 56 lies in a first plane $P_1$, the second section 58 lies in a second plane $P_2$, and the inclined section 60 lies in a third plane $P_3$. The third plane $P_3$ is neither perpendicular nor parallel to the first or second planes $P_1$, $P_2$, and is thus oblique thereto.

The arrangement of the lever 50 is such that the second section 58 is spaced-apart above the body 32 of the end cap 24. As such, a user may apply pressure to the second section 58, thereby forcing the second section 58 downward relative to FIG. 3A. The user may apply pressure to the second section 58 with their thumb or finger. Thus, no separate tools are required.

The body 32 of the end cap provides a fulcrum for the lever 50. In particular, an upper surface of the body 32 includes a recess 62 adjacent the center section 42 of the spring clip 36. A portion of the lever 50 is configured to rest in the recess 62, and the lever 50 is configured to pivot at a point within the recess 62 when pressure is applied to the second section 58. The lever 50, in this example, includes a junction 64 at a point where the first section 56 meets the inclined section 60. The junction 64, in this example, includes a rounded surface that is convex facing the recess 62 to increase the ease with which the lever 50 pivots.

As the second section 58 is forced downward relative to FIG. 3A, the lever 50 pivots about the fulcrum (e.g., at a point within the recess 62 and adjacent the junction 64), which imparts a upward force onto the spring clip 36. This upward force causes the spring clip 36 to interact with the body 32 such that the ends 38, 40 are drawn away from one another. Drawing the ends 38, 40 away from one another allows a user to remove the ball 30 from the socket 34, which in turn allows the user to detach the gas assist strut 20 from the liftgate 14. The disclosed arrangement of the lever 50 provides a relatively large moment arm, which requires a relatively minimal input force from the user. Thus, the user can detach the gas assist struts with relative ease.

While they are described separately, the spring clip 36 and lever 50 may be integrally formed from a single piece of metallic material. In fact, in FIGS. 3A and 3B, the spring clip 36 and lever 50 are integrally formed. In other examples, the spring clip 36 and lever 50 are formed separately and attached to one another, as in the examples of FIGS. 4 and 5.

In FIG. 4, the first section 56 of the lever is welded to the center section 42 of the spring clip 36. In particular, the first section 56 is welded to a top (relative to the arrangement of FIG. 4) of the center section 42. This is compared with the arrangement of FIGS. 3A and 3B, where the first section 56 and the center section 42 are co-planar. The lever 50 in this example may be made of a single strip of metallic material, or may be provided by a strip of metallic material that has been doubled-over. Regardless, the lever 50 is arranged and functions substantially similar to lever 50 described relative to FIGS. 3A and 3B.

In yet another example, shown in FIG. 5, the first section 56 of the lever 50 is crimped onto the center section 42 of the spring clip 36. In this example, the first section 56 includes opposing tabs 66, 68 that are pressed around edges of the center section 42. In this way, the first section 56 is partially wrapped around the center section 42 of the spring clip. While welding and crimping have been shown in the figures and described herein, this disclosure extends to other attachment techniques.

Although a specific component relationship is illustrated in the figures of this disclosure, the illustrations are not intended to limit this disclosure. In other words, the placement and orientation of the various components of the vehicle 10 are shown schematically and could vary within the scope of this disclosure. In addition, the various figures accompanying this disclosure are not necessarily to scale, and some features may be exaggerated or minimized to show certain details of a particular component or arrangement.

It should be understood that terms such as "about," "substantially," and "generally" are not intended to be boundaryless terms, and should be interpreted consistent with the way one skilled in the art would interpret those terms. Further, directional terms such as "above," "below," "upward," "downward," "forward," "rearward," "inside," "outside," "interior," "exterior," "vertical," "top," and "bottom," etc., are used with reference to the arrangement of the components in the figures, and are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An end cap for a gas assist strut, comprising:
 a body providing a socket;
 a spring clip having ends projecting into the socket; and
 a lever operatively connected to the spring clip, wherein application of pressure to the lever in a direction toward the body draws the ends of the spring away from one another, wherein an upper surface of the body includes a recess directly adjacent a center section of the spring clip, and a junction of the lever is received in the recess such that the recess provides a fulcrum for the lever.

2. The end cap as recited in claim 1, wherein the lever includes a first end adjacent the center section of the spring clip and a second end opposite the first end.

3. The end cap as recited in claim 2, wherein the second end is a free end.

4. The end cap as recited in claim 2, wherein the lever is integrally formed with the spring clip.

5. The end cap as recited in claim 2, wherein the first end of the lever is attached to the center section of the spring clip.

6. The end cap as recited in claim 5, wherein the lever is welded to the center section of the spring clip.

7. The end cap as recited in claim 5, wherein the lever is crimped onto the center section of the spring clip.

8. The end cap as recited in claim 2, wherein:
 the lever includes a first section adjacent the first end, a second section adjacent the second end and spaced-apart from the first section, and an inclined section between the first and second sections, and
 the inclined section is oblique to the first and second sections.

9. The end cap as recited in claim 8, wherein the junction is between the first section and the inclined section, and the junction is configured to directly contact the recess.

10. The end cap as recited in claim 1, wherein the surface of the junction is rounded.

11. The end cap as recited in claim 10, wherein the surface of the junction is convex facing the recess, and the surface of the recess is concave facing the junction.

12. The end cap as recited in claim 1, wherein a section of the lever in contact with the center section of the spring is planar and extends to the fulcrum.

13. The end cap as recited in claim 1, wherein the recess is directly adjacent a groove of the body, wherein the spring is at least partially arranged in the groove.

14. A motor vehicle, comprising:
a component having a ball supported on a stem;
a gas assist strut connected to the component, the gas assist strut including an end cap, the end cap, comprising:
   a body providing a socket, the ball received in the socket;
   a spring clip having ends projecting into the socket; and
   a lever operatively connected to the spring clip, wherein application of pressure to the lever in a direction toward the body draws the ends of the spring away from one another such that the ball may be removed from the socket, wherein an upper surface of the body includes a recess directly adjacent a center section of the spring clip, and a junction of the lever is received in the recess such that the recess provides a fulcrum for the lever.

15. The motor vehicle as recited in claim 14, wherein the component is a one of a vehicle body, a liftgate, a swing gate, and a flipglass window.

16. A method, comprising:
applying pressure to a lever of an end cap of a gas assist strut, thereby drawing ends of a spring clip away from one another, wherein the lever is operatively connected to the spring clip, wherein an upper surface of a body of the end cap includes a recess directly adjacent a center section of the spring clip, and a junction of the lever is received in the recess such that the recess provides a fulcrum for the lever, wherein the pressure is applied to the lever in a direction toward the body;
removing a ball from a socket of the end cap.

17. The method as recited in claim 16, wherein the ends of the spring clip project into the socket when pressure is not applied to the lever.

18. The method as recited in claim 17, wherein the ends of the spring clip are biased toward one another.

19. The method as recited in claim 16, wherein the ball is attached to a component of a motor vehicle.

* * * * *